United States Patent
Camberlin et al.

(10) Patent No.: US 6,239,232 B1
(45) Date of Patent: May 29, 2001

(54) POLYETHERIMIDE OR POLYSULPHONE WITH POLYEPOXIDE PARTIALLY REACTED WITH AROMATIC POLYAMINE

(75) Inventors: Yves Camberlin, Caluire; Jacky Grenier, Vignieu; Jacques Vallet, Lyons; Anthony Bonnet, Passins; Jean-Pierre Pascault, Villeurbanne; Mohamed Taha, Clapiers, all of (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 09/235,336

(22) Filed: Jan. 22, 1999

(30) Foreign Application Priority Data

Jan. 22, 1998 (FR) .................................... 98 00757

(51) Int. Cl.$^7$ ............................ C08L 63/02; C08L 63/04; C08L 79/08; C08L 81/06
(52) U.S. Cl. .................................... 525/423; 504/523
(58) Field of Search ................... 525/423, 504, 525/523

(56) References Cited

U.S. PATENT DOCUMENTS

| 4,808,441 | * | 2/1989 | Chattha et al. | 528/99 |
| 4,978,791 | * | 12/1990 | Volker et al. | 564/335 |
| 5,310,825 | * | 5/1994 | Babayan et al. | 525/423 |
| 5,312,651 | * | 5/1994 | Takada et al. | 427/386 |

FOREIGN PATENT DOCUMENTS

| 0 745 640 | | 12/1996 | (EP) . |
| 62-82023 | * | 4/1987 | (JP) . |
| 5-132540 | * | 5/1993 | (JP) . |

OTHER PUBLICATIONS

Chemical abstracts registry No. 25135–51–7 for Udel P 1800 polyphenylsulfone, 1989.*
Chemical abstracts accession No. 1995:868129, Girard–Reydet et al., Macromolecules, vol. 28, No. 23, 1995, pp. 7599–7607.*
Chemical abstracts accession No. 1996:1820, Girard–Reydet et al., Annual Technical Conference–Society of Plastics Engineering, 53rd, vol. 2, 1995, pp. 2646–2650.*

* cited by examiner

*Primary Examiner*—Robert E. L. Sellers
(74) *Attorney, Agent, or Firm*—Millen, White, Zelano & Branigan, P.C.

(57) ABSTRACT

A polymer composition comprises at least one thermoplastic polymer selected from the group formed by polyetherimides and polysulphones and at least one epoxy resin modified by at least one aromatic polyamine. The epoxy resin is formed from at least one polyepoxide containing at least 2 epoxy groups in its molecule and the aromatic polyamine contains at least two primary amine groups in its molecule and preferably at least one alkyl substituent containing 1 to 12 carbon atoms located alpha to one of the amino groups. The molar ratio of the polyamine to the epoxy is such that, each amino group corresponds to 1.6 to 2.6 epoxy groups. The thermoplastic polymer content is preferably about 15% to 98% by weight with respect to the total weight of the polymer composition; the amount of epoxy resin modified by at least one aromatic polyamine is about 2% to 85% by weight with respect to the total weight of the polymer composition. These polymer compositions can be prepared in the molten state, without a solvent, at a temperature of about 100° C. to 250° C.

13 Claims, No Drawings

POLYETHERIMIDE OR POLYSULPHONE WITH POLYEPOXIDE PARTIALLY REACTED WITH AROMATIC POLYAMINE

During the course of a study on pipeline coatings, the Applicant was concerned with polymer compositions. Following this work, compositions of particular interest for coating pipelines, particularly externally, were developed, these compositions containing at least one heat stable thermoplastic polymer which is amorphous or of low crystallinity, and at least one modified epoxy resin.

The present invention concerns polymer compositions, and a process for synthesising these compositions. It also concerns the use of these compositions, in particular for coating conduits, especially pipeline coatings, to obtain pre-impregnates for the production of composition materials, also to produce adhesives and mastics, in particular to rehabilitate oil or geothermal wells or more generally any excavations.

Pipelines are metal tubes, often formed from steel, essentially used in wells to transport crude oil and natural gas, but any type of fluid could be transported by this pipeline. The internal surface of the pipeline is corroded by the transported fluid. When the transported fluid is oil, the sulphur-containing compounds contained in the oil are the main causes of the corrosion. When drilling offshore, the external surface of the pipeline is also corroded by sea water. Treating conduit surfaces has already been described in the prior art. As an example, U.S. Pat. No. 5,447,798 describes a concrete conduit on which an intermediate layer is deposited which is a mixture of epoxy resin modified by a polysulphide and concrete, then a layer of epoxy resin modified by a polysulphide.

The principal problem with depositing a polymer on a metal surface, for example the external and/or internal surface of a pipeline, for example of steel, is the behaviour of the polymer when it is subjected to heat stress. Even if the oil is cooled before transporting it, the pipeline is often heated to a temperature of about 50° C. to 200° C. by contact with hot oil. Certain polymers, for example polypropylene, tend to deform and no longer adhere to the metal once the temperature exceeds 130° C. Other polymers, such as polyetherimides or polysulphones, adhere at high temperatures but their application temperature (at which it is deposited on the metal) is higher, about 360° C. Further, metals, in particular steel, may undergo phase distortions from a temperature of about 250° C., and certain of their mechanical and physical properties can be altered.

In addition, good adhesion of the polymer at a higher temperature enables the oil to be transported without the need to cool it, or at least it only needs to be cooled to a lesser extent. At a relatively high temperature, oil is less viscous and therefore easier to transport.

The criteria which the desired polymer compositions must satisfy are thus a temperature for deposition on steel such that the steel is not altered and good adhesion to the steel.

The present invention provides a polymer composition which overcomes the above disadvantages. The application temperature at which the polymer composition of the present invention is deposited onto steel is about 180° C. to 250° C., and in that temperature range, the mechanical behaviour of steel is good. The polymer composition of the present invention has particular good adhesion, in particular to steel, high stiffness, and good resistance to sea water. Further, these qualities are not substantially altered when the compositions are aged.

The polymer compositions of the present invention contain at least one heat stable thermoplastic polymer, preferably amorphous, and at least one epoxy resin modified by at least one aromatic polyamine, preferably sterically hindered.

The heat stable thermoplastic polymer preferably represents about 15% to 98%, more preferably 35% to 80% by weight, with respect to the total composition weight; preferably, the modified epoxy resin represents about 2% to 85%, more preferably about 20% to 65% by weight, with respect to the total composition weight.

In the present description, the "aromatic polyamine" contains at least two primary amine groups in its molecule. It is preferably sterically hindered, i.e., it contains at least one alkyl substituent containing 1 to 12 carbon atoms located alpha to one of the amine groups.

The most frequently used thermoplastic polymers are polysulphones and polyetherimides.

The term "polysulphone" may be the source of an ambiguity. The first polymer of commercial importance with a base unit containing a sulphone group —$SO_2$— was the polymer sold by AMOCO under the trade name UDEL. Because of this, this particular polysulphone is often designated by the generic term polysulphone. In the present description, the term "polysulphone" is used in its generic sense, and not just the limiting sense of a UDEL type polysulphone.

The polysulphones used in the polymer compositions of the invention are preferably aromatic polysulphones and, more preferably, UDEL type polysulphones, RADEL A polysulphone type polyether-sulphones sold by AMOCO, and RADEL R type polyphenylene sulphones also sold by AMOCO.

The polyetherimides used in the polymer compositions of the invention are preferably ULTEM type polyetherimides sold by General Electric Plastics.

These polyetherimides can be used alone, mixed with each other or mixed with other polymers such as polyphenylene ethers, aromatic polyetherketones or polyphenylene sulphides. Polymer compositions of the present invention comprising polyphenylene ethers contain about 5% to 98% by weight thereof with respect to the total weight of the thermoplastic polymers. Polymer compositions of the present invention comprising aromatic polyetherketones contain about 1% to 50% by weight thereof with respect to the total weight of thermoplastic polymers. Polymer compositions of the present invention comprising polyphenylene sulphides contain about 1% to 50% by weight thereof with respect to the total weight of thermoplastic polymers.

The epoxy resins modified by at least one aromatic polyamine, preferably sterically hindered, used in the polymer compositions of the present invention are epoxy resins formed from at least one polyepoxide containing at least two epoxy groups in its molecule and at least one aromatic polyamine, preferably sterically hindered, the mole ratio of the amine to the epoxy being such that each amine group corresponds to 1.6 to 2.6 epoxy groups.

Preferred aromatic polyamines are selected for their low reactivity and for their non toxic nature.

The epoxy resin can be selected from the group formed by the following commercially available resins: the diglycidylether of bis-phenol-A or bis-phenol F, bis-phenol formol resin, phenol-novolac resin, cycloaliphatic resins, tri- or tetrafunctional resins, resins formed from triglycidylether-isocyanurate and/or triglycidylether-cyanurate and/or triglycidyl-cyanurate and/or triglycidyl-isocyanurate or mixtures of at least two of these resins.

The epoxy resins obtained from the epoxy resins cited in U.S. Pat. No. 4,921,047 can also be used in the present invention.

The aromatic polyamines used in the polymer compositions of the present invention includes a first series of aromatic amines comprising a single aromatic ring such as 3,5-diethyl-2,4-diaminotoluene, 3,5-diethyl-2,6-diaminotoluene and mixtures of these two isomers. Usually, a mixture of these two isomers generally known as DETDA is used.

In the second series of amines used in the present invention, amines containing at least two aromatic rings can be considered, these two aromatic rings generally being connected to each other by a bivalent linear or branched hydrocarbon residue containing 1 to 18 carbon atoms. These two aromatic rings are either connected via a bivalent alkylene group or are connected one to the other via a bivalent linear or branched hydrocarbon residue containing 6 to 18 carbon atoms and containing an aromatic ring.

The aromatic polyamine can also contain at least one substituent selected from the group formed by fluorine, iodine, bromine and chlorine. It preferably contains at least two alkyl substituents, each being alpha either side of an amino group.

When the two aromatic rings are connected via a bivalent alkylene residue, this residue is preferably a methylidene group which is non substituted or substituted by at least one radical selected from alkyl radicals and halogenoalkyl radicals containing 1 to 3 carbon atoms. As an example, this alkylene residue is selected from the group formed by the methylidene group, the isopropylidene group, the halogenoisopropylidene groups, and the hexafluoroisopropylidene group. In this case, the amine is preferably selected from the group formed by:

4,4'-methylene-bis(2,6-dimethylaniline) or M-DMA;
4,4'-methylene-bis(2-isopropyl-6-methyl-aniline) or M-MIPA:
4,4'-methylene-bis(2,6-diethylaniline) or M-DEA;
4,4'-methylene-bis(2,6-diisopropylaniline) or M-DIPA; and
4,4'-methylene-bis(3-chloro-2,6-diethylaniline) or M-CDEA.

Of these amines, 4,4'-methylene-bis(2,6-diethylaniline) and 4,4'-methylene-bis(3-chloro-2,6-diethylaniline) are of particular interest.

When the amine contains two aromatic rings which are connected to each other via a bivalent hydrocarbon residue which may or may not be substituted, containing 6 to 18 carbon atoms and containing an aromatic ring, it is preferably selected from the group formed by:

4,4'-(phenylene-diisopropyl)-bis(2,6-dimethyl-aniline);
4,4'-(phenylene-diisopropyl)-bis(2,6-diethyl-aniline);
4,4'-(phenylene-diisopropyl)-bis(2,6-dipropyl-aniline);
4,4'-(phenylene-diisopropyl)-bis(2,6-diisopropyl-aniline);
4,4'-(phenylene-diisopropyl)-bis(2,6-dimethyl-3-chloro-aniline);
4,4'-(phenylene-diisopropyl)-bis(2,6-diethyl-3-chloro-aniline);
4,4'-(phenylene-diisopropyl)-bis(2,6-dipropyl-3-chloro-aniline);
4,4'-(phenylene-diisopropyl)-bis(2,6-diisopropyl-3-chloro-aniline);
3,3'-(phenylene-diisopropyl)-bis(2,6-dimethyl-aniline);
3,3'-(phenylene-diisopropyl)-bis(2,6-diethyl-aniline);
3,3'-(phenylene-diisopropyl)-bis(2,6-dipropyl-aniline);
3,3'-(phenylene-diisopropyl)-bis(2,6-dimethyl-3-chloro-aniline);
3,3-(phenylene-diisopropyl)-bis(2,6-diethyl-3-chloro-aniline);
3,3'-(phenylene-diisopropyl)-bis(2,6-dipropyl-3-chloro-aniline);
3,3-(phenylene-diisopropyl)-bis(2,6-diisopropyl-aniline); and
3,3'-(phenylene-diisopropyl)-bis(2,6-diisopropyl-3-chloro-aniline).

The polymer compositions of the present invention can also contain catalysts which are active for the reaction between the epoxy resins and the sterically hindered aromatic polyamines. The most frequently used active catalysts are imidazoles, tertiary amines and boron trifluoride based complexes. Additives selected from the group formed by antioxidants, pigments, adhesion promoters, heat stabilisers and organic, mineral or metallic fillers can also be added.

The present invention also concerns the synthesis of polymer compositions containing at least one thermoplastic polymer, preferably amorphous, and at least one epoxy resin modified by at least one aromatic polyamine.

Synthesis is generally carried out without a solvent in the molten state at a temperature of about 100° C. to 250° C., preferably about 150° C. to 200° C. by bringing the reactants into contact in suitable proportions to obtain a final composition which preferably has a thermoplastic polymer content of about 15% to 98% by weight, more preferably about 35% to 80% by weight, and a modified epoxy resin content of about 2% to 85% by weight, more preferably about 20% to 65% by weight, with respect to the total composition weight.

The synthesis of the present invention can be carried out using any type of mixer: preferably, a twin screw extruder is used.

The epoxy resins, aromatic polyamines and any additives can be introduced into the mixer in the form of a premix to which the thermoplastic polymer is added. It is also possible to introduce each reactant into the reactor separately via different inlet zones or via a single inlet zone. The scope of the invention also encompasses forming an initial mixture of thermoplastic polymers and epoxy resins then adding the hardening agent which is the aromatic polyamine. It is also possible to introduce the polyamine into the mixer in a zone close to the zone for recovering the polymer composition.

Once mixed, the polymer composition is formed then it is preferably cured. Curing generally consists of heating the composition to a temperature of about 200° C. to 250° C., for example for a period of about 10 minutes to 12 hours. This is preferably carried out in an oven.

The properties of the compositions of the present invention, in particular their adhesion properties, are of the order of those required for the most demanding use, in particular for use in the aeronautical industry.

Further, the resistance of these compositions to sea water is good and measurements carried out on compositions which have undergone accelerated ageing show that these compositions were only very slightly altered by that ageing.

These compositions have applications in the fields of surface coatings, in particular for conduits and more particularly for coating pipelines or in matrices of composition materials. They can also be used to produce adhesives and mastics, in particular for adhesives for pipeline junctions and to rehabilitate oil or geothermal wells or, more generally, all excavations.

The following examples illustrate the invention without limiting its scope.

The polymer compositions in the following examples were prepared using a twin screw extruder from CLEXTRAL; this extruder comprised a plurality of positions for introducing the reactants to be mixed.

For these examples, the epoxy resin and aromatic polyamine were first mixed; this mixture will hereinafter be termed the "premix". The thermoplastic polymers were introduced via an inlet zone and the premix was introduced via a further inlet zone. The rate for the premix was constant, and was introduced using a gear pump. In contrast, the thermoplastic polymers were introduced using a gravimetric metering hopper which enabled the rate of the thermoplastic polymers to be varied, and thus polymer compositions with different modified resin/thermoplastic polymer ratios could be produced.

The thermoplastic polymers were introduced into the extruder's inlet zone at the end opposite to the zone for recovering the polymer composition. The temperature in this inlet zone was 100° C. They were then entrained in a second zone where the temperature was 150° C. and into which the premix was introduced. These reactants were then entrained by the twin screw extruder, with the temperature inside the extruder slowly increasing to attain 185° C. and the extruder outlet.

EXAMPLE 1

In this example, mixtures of polymer compositions comprising a polyetherimide and a modified epoxy resin were prepared.

The modified epoxy resin comprised 8.016 kg of the diglycidyl ether of bis-phenol-A (DGEBA), sold under reference number LY556 by CIBA-GEIGY, and 3.984 kg of 4,4'-methylene-bis(3-chloro-2,6-diethylaniline) (MCDEA), sold by LONZA.

Before its introduction into the extruder, this mixture was heated to 80° C. with stirring. The progress of the reaction of this mixture was measured by exclusion chromatography. The reactivity was very low: 5 hours at 60° C. resulted in a 1% advance in the reaction.

The polyetherimide used was sold by General Electric Plastics with reference ULTEM 1000; its number average molecular mass was 26000 g/mol and its granulometry was 300 micrometers. Before its introduction into the extruder, the polyetherimide was kept in an oven at 120° C. for two hours.

The modified epoxy resin was introduced into the extruder at a constant rate of 2 kg/h using a gear pump. The polyetherimide was introduced at a rate of 4.75 kg/h using a gravimetric metering hopper to obtain a composition containing 30% by weight of modified epoxy resin, then at a rate of 2.00 kg/h to produce a composition containing 50% by weight of modified epoxy resin, and finally at a rate of 1.30 kg/h to produce a composition containing 60% by weight of modified epoxy resin, these percentages by weight of modified epoxy resin being calculated with respect to the total composition.

At the extruder outlet, homogeneous mixtures were obtained, the conversion of reactive epoxy functions being less than 10%.

After extrusion, in order to carry out adhesion measurements using the lap shear test, these compositions were deposited on steel at a temperature corresponding to their application temperature—these temperatures are shown in Table 1a—, then cured at 220° C. for one hour.

These compositions were also pressed into a mould and cured at 220° C. for one hour to form them into test pieces with a view to determining their thermomechanical properties.

Measurements of steel adhesion, thermomechanical behaviour, resistance to sea water and ageing behaviour were carried out on the different compositions.

The adhesion properties of the different compositions were determined using a lap shear method (ASTM D1002). To determine the adhesion, steel test pieces, previously cleaned with a stainless steel brush rotating at high speed, were glued. The adhesive surface was $(25.4 \times 10^{-3}) \times (12.7 \times 10^{-3})$ and the thickness of the adhesive joint was 125 micrometers. Gluing was carried out by simple contact at a temperature corresponding to the application temperature for each composition—these temperatures are shown in Table 1a—, then they were cured for 1 hour at 220° C.

These adhesion tests using the lap shear method were carried out using an apparatus sold by INSTRON (INSTRON-1175) provided with a measuring head of 100 kN (kiloNewton) with an operating speed of $10^{-3}$ m/min.

Examples 1.2, 1.3 and 1.4 of Table 1a are in accordance with the invention; Example 1.1 is a comparative example; the composition of Example 1.1 contained no modified epoxy resin; it contained only a ULTEM 1000 polyetherimide. For the different compositions, the application temperature was determined along with the maximum load. The lap shear breaking stress was deduced by relating this maximum load to the adhesive surface area.

TABLE 1a

| Examples | 1.1 (comparative) | 1.2 (invention) | 1.3 (invention) | 1.4 (invention) |
|---|---|---|---|---|
| Modified epoxy resin (% by weight with respect to total composition) | 0 | 30 | 50 | 60 |
| Application temperature (° C.) | 320 | 230 | 210 | 200 |
| Maximum load (kiloNewton) | 6.1 | 6.5 | 6.8 | 7.4 |
| Stress at rupture (MPa) | 19 | 20 | 21 | 23 |

This first series of results shows that the compositions of the present invention were applied at a temperature of less than 250° C. The lap shear breaking stress for these compositions was very good: they were all more or less 20 MPa.

The loss of adhesion after 6 months at 150° C. in air was low. The lap shear breaking stress measured for the composition containing 30% of modified epoxy resin dropped from 20 MPa to 17 MPa.

The thermomechanical properties of the polymer compositions were determined using DMTA (Dynamic Mechanical Thermal Analysis), in sandwich mode. The measurements were carried out by moulding the different compositions into plates $2 \times 10^{-3}$ thick at a pressure of 5 MPa, then heating the mouldings to 220° C. for 1 hour. The elastic modulus and the tangent of the loss angle were measured as a function of temperature at a frequency of 1 Hz using a DMTA apparatus from Polymer Laboratories.

Glass transition temperatures (Tg) and the elastic modulus E' at 25° C., at 150° C. and at 175° C. were measured using the compositions defined in Table 1a. The results are shown in Table 1b.

TABLE Ib

| Examples | 1.1 (comparative) | 1.2 (invention) | 1.3 (invention) | 1.4 (invention) |
|---|---|---|---|---|
| Tg, ° C. | 220 | 218 | 215 | 215 |
| Modulus E' at 25° C., MPa | 1600 | 1600 | 1000 | 1250 |
| Modulus E' at 150° C., MPa | 1250 | 800 | 550 | 800 |
| Modulus E' at 175° C., MPa | 1200 | 600 | 350 | 300 |

The elastic modulus indicates the stiffness of the materials. These results show that up to 150° C. the stiffness of the polymer compositions was comparable to that of polyetherimide (Example 1.1). At 175° C., they still had sufficient stiffness for use as a coating.

A series of sea water resistance tests was also carried out. The compositions from Examples 1.1, 1.3 and 1.4 were moulded into $(50 \times 10^{-3} \text{ m}) \times (50 \times 10^{-3} \text{ m}) \times (2 \times 10^{-3} \text{ m})$ plaques. These test pieces were immersed in synthetic sea water contained in a sealed reactor heated to 160° C., at an absolute pressure of 0.62 MPa. Water absorption measurements were carried out by determining the variation in the weight of the test pieces after 3 months immersion. The results are shown in Table 1c.

TABLE 1c

| Examples | 1.1 (comparative) | 1.3 (invention) | 1.4 (invention) |
|---|---|---|---|
| Water take-up (wt %) | 4.4 | 3.6 | 3.2 |
| Distortion | large | small | none |

The water take-up in the compositions of the invention was small. Increasing the quantity of epoxy resin reduced water take-up. Further, these compositions suffered little or no distortion. After 3 months immersion, the test piece coatings were practically entirely unchanged.

EXAMPLE 2

In this example, mixtures of polymer compositions comprising a polyphenylene sulphone and a modified epoxy resin were prepared.

The modified epoxy resin comprised 8.016 kg of the diglycidyl ether of bis-phenol-A (DGEBA), sold under reference number LY556 by CIBA-GEIGY, and 3.984 kg of MCDEA sold by LONZA.

Before its introduction into the extruder, this mixture was heated to 80° C. with stirring. The progress of the reaction of this mixture was measured by exclusion chromatography. The reactivity was very low: 5 hours at 60° C. resulted in a 1% advance in the reaction.

The polyphenylene sulphone used was RADEL R sold by AMOCO.

The modified epoxy resin was introduced into the extruder at a constant rate of 2 kg/h using a gear pump. The polyphenylene sulphone was introduced at a rate of 2.00 kg/h using a gravimetric metering hopper to obtain a composition containing 50% by weight of modified epoxy resin, then at a rate of 1.10 kg/h to produce a composition containing 65% by weight of modified epoxy resin. These percentages by weight of modified epoxy resin were calculated with respect to the total composition.

At the extruder outlet, homogeneous mixtures were obtained, the conversion of reactive epoxy functions being less than 10%.

After extrusion, in order to carry out adhesion measurements using the lap shear test, these compositions were deposited on steel at a temperature corresponding to their application temperature—these temperatures are shown in Table 2a—, then cured at 220° C. for one hour.

To determine their thermomechanical properties, these compositions were pressed into a mould then cured at 220° C. for one hour to form them into test pieces.

The adhesion properties of the different compositions were determined by means of a lap shear test (ASTM D1002) using the method described in Example 1.

Examples 2.2 and 2.3 of the following table are in accordance with the invention; Example 2.1 is a comparative example the composition of which contained no modified epoxy resin, but contained only a RADEL R type polyphenylene sulphone. For the different compositions, the application temperature was determined along with the maximum load. The lap shear breaking stress was deduced by relating this maximum load to the adhesive surface area.

TABLE 2a

| Examples | 2.1 (comparative) | 2.2 (invention) | 2.3 (invention) |
|---|---|---|---|
| Modified epoxy resin (% by weight with respect to total composition) | 0 | 50 | 65 |
| Application temperature (° C.) | 320 | 190 | 170 |
| Maximum load (kiloNewton) | 6.5 | 6.1 | 6.8 |
| Stress at rupture (MPa) | 20 | 19 | 21 |

This first series of results shows that the compositions of the present invention were applied at a temperature of less than 200° C. The lap shear breaking stress of these compositions was very good: they were all more or less 19 MPa.

The thermomechanical properties of the polymer compositions were determined by DMTA in sandwich mode using the same process as in Example 1.

Glass transition temperatures (Tg) and the elastic modulus E' at 25° C., 150° C. and at 175° C. were measured using the compositions defined in Table 2a. The results are shown in Table 2b.

TABLE 2b

| Examples | 2.1 (comparative) | 2.2 (invention) | 2.3 (invention) |
|---|---|---|---|
| Tg, ° C. | 220 | 205 | 200 |
| Modulus E' at 25° C., MPa | 1200 | 1100 | 1300 |
| Modulus E' at 150° C., MPa | 1050 | 850 | 850 |
| Modulus E' at 175° C., MPa | 1000 | 700 | 650 |

The elastic modulus indicates the stiffness of the materials. These results show that even when they were heated to quite a high temperature, the stiffness of these polymer compositions was sufficient for use as a coating.

A series of sea water resistance tests was also carried out. The compositions from Examples 2.1 and 2.2 were moulded into $(50\times10^{-3}$ m$)\times(50\times10^{-3}$ m$)\times(2\times10^{-3}$ m$)$ plaques. These test pieces were immersed in synthetic sea water contained in a sealed reactor heated to 160° C., at an absolute pressure of 0.62 MPa. Water absorption measurements were carried out by determining the variation in the weight of the test pieces after 3 months immersion.

TABLE 2c

| Examples | 2.1 (comparative) | 2.2 (invention) |
|---|---|---|
| Water take-up (wt % | 2.6 | 2 |
| Distortion | none | none |

The water take-up in the compositions of the invention was low. The increase in the quantity of epoxy resin reduced water take-up, and this composition suffered little or no distortion. After 3 months immersion, the test piece coating was unchanged.

EXAMPLE 3

In this example, mixtures of polymer compositions comprising a polyetherimide, a polyphenylene ether and a modified epoxy resin were prepared.

The modified epoxy resin comprised 8.016 kg of the diglycidyl ether of bis-phenol-A (DGEBA), sold under reference number LY556 by CIBA-GEIGY, and 3.984 kg of MCDEA sold by LONZA.

Before its introduction into the extruder, this mixture was heated to 80° C. with stirring. The progress of the reaction of this mixture was measured by exclusion chromatography. The reactivity was very low: 5 hours at 60° C. resulted in a 1% advance in the reaction.

The polyetherimide used was sold by General Electric Plastics under the trade name ULTEM 1000. This polyetherimide was that used in Example 1 above. The polyphenylene ether used is sold by General Electric Plastics under the trade name PPE 800; its number average molecular weight is 12000 g/mol.

The modified epoxy resin was introduced into the extruder at a constant rate of 2 kg/h using a gear pump. The thermoplastic polymers (polyetherimide and polyphenylene ether) were introduced via the same introduction zone, the quantity of polyetherimide being equal to the quantity of polyphenylene ether. These two polymers were introduced at a total rate of 2.00 kg/h using a gravimetric metering hopper, to obtain a composition containing 50% by weight of modified epoxy resin, then at a rate of 1 kg/h to produce a composition containing 67% by weight of modified epoxy resin. These percentages by weight of modified epoxy resin were calculated with respect to the total composition.

At the extruder outlet, homogeneous mixtures were obtained, the conversion of reactive epoxy functions being less than 10%.

After extrusion, in order to carry out adhesion measurements using the lap shear test, these compositions were deposited on steel at a temperature corresponding to their application temperature—these temperatures are shown in Table 3a—, then cured at 220° C. for one hour.

To determine their thermomechanical properties, these compositions were pressed into a mould then cured at 220° C. for one hour to form them into test pieces.

The adhesion properties of the different compositions were determined using the ASTM D1002 method as described in Example 1.

Examples 3.2 and 3.3 of the following table are in accordance with the invention; Example 3.1 is a comparative example the composition of which contained no modified epoxy resin, but contained 50% by weight of PPE 800 type polyphenylene ether and 50% by weight of ULTEM 1000 type polyetherimide. For the different compositions, the application temperature was determined along with the maximum load. The lap shear breaking stress was deduced by relating this maximum load to the adhesive surface area.

TABLE 3a

| Examples | 3.1 (comparative) | 3.2 (invention) | 3.3 (invention) |
| --- | --- | --- | --- |
| Modified epoxy resin (% by weight with respect to total composition) | 0 | 50 | 67 |
| Application temperature (° C.) | 300 | 220 | 160 |
| Maximum load (kiloNewton) | 2.2 | 7.4 | 7.7 |
| Stress at rupture (MPa) | 7 | 23 | 24 |

This first series of results shows that the compositions of the present invention were applied at a temperature of less than 250° C. The lap shear breaking stress of these compositions was very good: they were all more or less equal to 23 MPa.

The thermomechanical properties of the polymer compositions were determined by DMTA in sandwich mode using the same process as in Example 1.

Glass transition temperatures (Tg) and the elastic modulus E' at 25° C., 150° C. and at 175° C. were measured using the compositions defined in Table 3a. The results are shown in Table 3b.

TABLE 3b

| Examples | 3.1 (comparative) | 3.2 (invention) | 3.3 (invention) |
| --- | --- | --- | --- |
| Tg, ° C. | 220 | 215 | 210 |
| Modulus E' at 25° C., MPa | 1100 | 1100 | 1100 |
| Modulus E' at 150° C., MPa | 1050 | 900 | 700 |
| Modulus E' at 175° C., MPa | 900 | 600 | 200 |

The elastic modulus indicate the stiffness of the materials. These results show that even when they were heated to quite a high temperature, the stiffness of these polymer compositions was sufficient for use as a coating.

Examples 1, 2 and 3 show the possibility of synthesising polymer compositions from different thermoplastic polymers and selecting the modified resin/thermoplastic polymer ratios from within a fairly wide range, while keeping an application temperature for depositing these polymers onto steel of less than 250° C. The adhesion of these polymer compositions to steel is good—in these examples, the lap shear breaking stress was at least 19 MPa—, and the high temperature stiffness (175° C.) was sufficient for use as a coating.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French application 98/00757 are hereby incorporated by reference. From the foregoing description, one skilled in the art can easily ascertain the essential characteristics of this invention, and without departing from the spirit and scope thereof, can make various changes and modifications of the invention to adapt it to various usages and conditions.

What is claimed is:

1. A homogeneous polymer composition comprising 35–98% by weight of said polymer composition of at least one thermoplastic polyetherimide, and at least one epoxy resin partially reacted with at least one aromatic polyamine, the epoxy resin being formed from at least one polyepoxide containing at least 2 epoxy groups and the aromatic polyamine containing at least two primary amine groups, the mole ratio of polyamine to epoxy compound being such that each amine group corresponds to 1.6 to 2.6 epoxy groups, said polymer composition having been produced by mixing the thermoplastic polymer, the epoxy resin and the aromatic polyamine in the molten state without a solvent at a temperature of about 100° to 250° C.

2. A polymer composition according to claim 1, characterized in that the aromatic polyamine comprises at least one alkyl substituent containing 1 to 12 carbon atoms located alpha to one of the amine groups.

3. A polymer composition according to claim 1, characterized in that the quantity of polyetherimide is about 35% to 80% by weight with respect to the total polymer composition weight and the quantity of epoxy resin modified by at least one aromatic polyamine is about 20% to 65% by weight with respect to the total polymer composition weight.

4. A polymer composition according to claim 1, characterized in that the aromatic polyamine is selected from the group formed by aromatic amines containing a single aromatic ring and aromatic amines containing at least two aromatic rings, the two aromatic rings being connected to each other by a bivalent linear or branched hydrocarbon residue containing 1 to 18 carbon atoms.

5. A polymer composition according to of claim 1, further comprising at least one additive selected from the group formed by catalysts active in the reaction between epoxy resins and sterically hindered amines, antioxidants, pigments, adhesion promoters, heat stabilisers, and organic, mineral or metallic fillers.

6. A process for synthesizing a polymer composition according to claims 1, comprising bringing said at least one polyetherimide into contact with said at least one epoxy resin and said at least one aromatic polyamine, without a solvent, in the molten state at a temperature of about 100° C. to 250° C.

7. A pre-impregnate for the production of composite materials, comprising a polymer composition according to claim 1.

8. An adhesive or mastic composition comprising a polymer composition according to claim 1.

9. A polymer composition produced according to claim 6 in the uncured state.

10. A polymer composition produced according to claim 6 in the cured state.

11. A polymer composition according to claim 1, wherein, the epoxy resin is the diglycidyl ether of bisphenol A, and the aromatic polyamine containing at least two primary amine groups is 4,4'-methylene-bis(3-chloro-2,6-diethylaniline).

12. A polymer composition according to claim 1, wherein less than 10% reactive epoxy functions are converted.

13. A polymer composition according to claim 1, wherein the epoxy resin partially reacted with the at least one aromatic polyamine is present in the polymer composition in a concentration of about 20% to 65% by weight with respect to the total weight of the polymer composition.

* * * * *